United States Patent [19]

Ellion et al.

[11] Patent Number: 5,005,657
[45] Date of Patent: Apr. 9, 1991

[54] POWDER DISPENSING AND MEASURING DEVICE

[76] Inventors: Dolores D. Ellion; M. Edmund Ellion, both of 2152 Highland Oaks Dr., Arcadia, Calif. 91006

[21] Appl. No.: 420,376

[22] Filed: Oct. 12, 1989

Related U.S. Application Data

[62] Division of Ser. No. 318,963, Mar. 6, 1989, Pat. No. 4,953,645.

[51] Int. Cl.⁵ .................... G01G 1/18; G01G 13/02
[52] U.S. Cl. ................................. 177/246; 177/122; 177/DIG. 11
[58] Field of Search ............... 177/170, 246, 120, 122, 177/DIG. 11

[56] References Cited

U.S. PATENT DOCUMENTS

| | | | |
|---|---|---|---|
| 849,418 | 4/1907 | Nickerson | 177/246 X |
| 3,185,235 | 5/1965 | Mittelsteadt | 177/246 |
| 3,387,679 | 6/1968 | Giulie et al. | 177/170 X |
| 3,987,861 | 10/1976 | Smith | 177/246 X |
| 4,715,245 | 12/1987 | Daloz | 177/251 X |

*Primary Examiner*—George H. Miller, Jr.
*Attorney, Agent, or Firm*—William J. Benman, Jr.

[57] ABSTRACT

An inexpensive, reliable, accurate, high speed powder dispensing apparatus is disclosed which includes a barrel for transferring powder from a first retainer to a second retainer. The barrel is vibrated to cause the powder to translate on a surface thereof. The vibration is controlled to cause a measured amount of powder to be dispensed. In a specific embodiment, two barrels are included to provide coarse and fine rates of powder dispensation. A specific embodiment includes a scale for weighing the discharged powder. The scale is equipped with a sensor, the output of which is used to control and limit the rate of powder flow up to a preselected amount. A additional novel feature of the invention is the use of a mechanism to assist in overcoming the inertia of the scale.

The invention provides an inexpensive, reliable, accurate, high speed powder dispensing apparatus. As the need to rotate barrels of the prior art is eliminated, the likelihood of occasional jamming is minimized. The momentum of the apparatus of the present invention is orders of magnitude lower than prior similar apparatus. As a result, the apparatus of the present invention ceases to dispense powder as soon as the power is shut off. The extremely low inertia of the vibrating barrels and the unique spring allow all types of powder to be dispensed rapidly and reliably without the requirement to adjust the relative positions of the fast and slow barrel sensors thereby decreasing complexity and costs.

6 Claims, 4 Drawing Sheets

POWDER DISPENSING AND MEASURING DEVICE

This is a division of application Ser. No. 07/318,963, filed Mar. 6, 1989 now U.S. Pat. No. 4,953,645.

BACKGROUND OF THE INVENTION

1. Field of the Invention

The present invention relates to powder measuring and dispensing devices. More specifically, the present invention relates to devices for quickly and accurately measuring preselected amounts of gunpowder.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

The accurate loading of rounds is critical to the safe and effective operation of a firearm. Various techniques and apparatus for measuring and dispensing gunpowder are known in the art. U.S. Pat. No. 4,696,356 issued to Ellion et al. on Sept. 29, 1987, disclosed a particularly advantageous device which constituted a substantial improvement in the gunpowder dispensing art. In this reference, Ellion et al. provide an accurate, high speed automatic powder dispensing and measurement apparatus which includes coarse and fine motor driven threaded tubes or barrels. As the barrels rotate, powder is transferred from a chamber to a scale. An electronic circuit monitors the weight of the powder in the scale and controls the rotation of the barrels accordingly. That is, as the scale approaches the preselected amount of powder, the electronic circuit responds by slowing the rotational rate of the appropriate barrel. When the preset amount is reached, the circuit terminates the rotation of the barrels.

While the above-described apparatus substantially eliminated many of the problems with prior powder dispensing devices, a need remains in the art to further improve the speed, accuracy, reliability and performance of powder dispensers. For example, the Ellion apparatus uses electric motors with reduction gears to supply power. This is due to the fact that the control of the amount of powder dispensed with a reasonable degree of precision requires the coarse feed barrel to be limited to approximately 120 revolutions per minute (RPM) and the fine feed barrel to be limited to roughly 30 revolutions per minute. Electric motors rated in this range operate at dangerously high voltage and current levels for the gunpowder loading application. On the other hand, small electric motors that operate with reasonable voltage and current ratings run in the 3000 to 6000 RPM range. As a result, small motors must be used with gears or other speed reduction components. The preferred approach, therefore, involved the use of a high speed motor, having a high angular momentum, with a set of expensive reduction gears.

In addition to being costly, the speed reduction components add to the system momentum. The high angular momentum of such systems poses problems in that the barrels continue to rotate after power to the motors is cut off. Even with a bypass diode across the motor to dissipate the momentum energy, a considerable amount of powder is dispensed after power is shut off. The solution offered in the referenced patent is to provide a vertical adjustment for the fast feed barrel control sensor. Unfortunately, that solution merely provides a better anticipation of the amount of the overflow, but does not limit the momentum of the gear motor-barrel assembly. The amount of powder dispensed after the power is shut off is controlled more precisely but there is still a variation in the amount of overflow between each loading which is difficult to anticipate or control.

Other problems associated with the apparatus of the referenced patent include scale inertia and jamming. The scale inertia problem arises when powder is loaded on the scale at a high speed. Whenever, this occurs, the inertia of the scale is such that the scale does not respond fast enough to provide a sufficiently accurate reading throughout the loading process. Thus, the desired weight is reached before the scale is in a position to activate the cutoff sensor. The result is an undesirable overflow and/or an overshoot of the cutoff point with some vacillation thereabout.

The jamming problem may arise when cylindrically shaped powder is caught partially into the inlet port of the rotating barrel or when very fine powder enters the bushings.

There is therefore a need in the art for an inexpensive, reliable, accurate, high speed powder dispensing apparatus.

Thus, one objective of the present invention is to reduce the momentum of the feed barrel of an Ellion loader by orders of magnitude thereby causing the apparatus to cease dispensing powder as soon as the power is shut off.

Another objective of the present invention is to provide a method to cause the balance arm of the scale to move slowly and smoothly to the final zero balance position while dispensing a high rate of powder, thereby preventing the supply of powder exceeding the preselected amount.

Yet another object of the present invention is to eliminate the need to rotate the barrels to minimize the likelihood of occasional jamming.

Still another object of the invention is to provide an inexpensive apparatus for accurately dispensing powder at a high rate.

SUMMARY OF THE INVENTION

The need in the art is addressed by the improved powder dispensing apparatus of the present invention. The apparatus of the invention includes a barrel for transferring powder from a first retainer to a second retainer. The barrel is vibrated to cause the powder to translate on a surface thereof. The vibration is controlled to cause a measured amount of powder to be dispensed to the second retainer.

In a specific embodiment, two barrels are included to provide coarse and fine rates of powder dispensation. A specific embodiment includes a scale for weighing the discharged powder. The scale is equipped with a sensor, the output of which is used to control and limit the rate of powder flow up to a preselected amount. An additional novel feature of the invention is the use of a mechanism to assist in overcoming the inertia of the scale.

The invention thus provides an inexpensive, reliable, accurate, high speed powder dispensing apparatus. As the need to rotate barrels is eliminated, the likelihood of occasional jamming is minimized. The momentum of the apparatus of the present invention is orders of magnitude lower than the loader of the referenced patent. As a result, the apparatus of the present invention ceases to dispense powder as soon as the power is shut off. The extremely low inertia of the vibrating barrels and the unique spring allow all shapes and sizes of powder to be dispensed rapidly and reliably without the requirement to adjust the relative positions of the fast and slow barrel sensors thereby decreasing complexity and costs.

DESCRIPTION OF THE INVENTION

Figure 1:
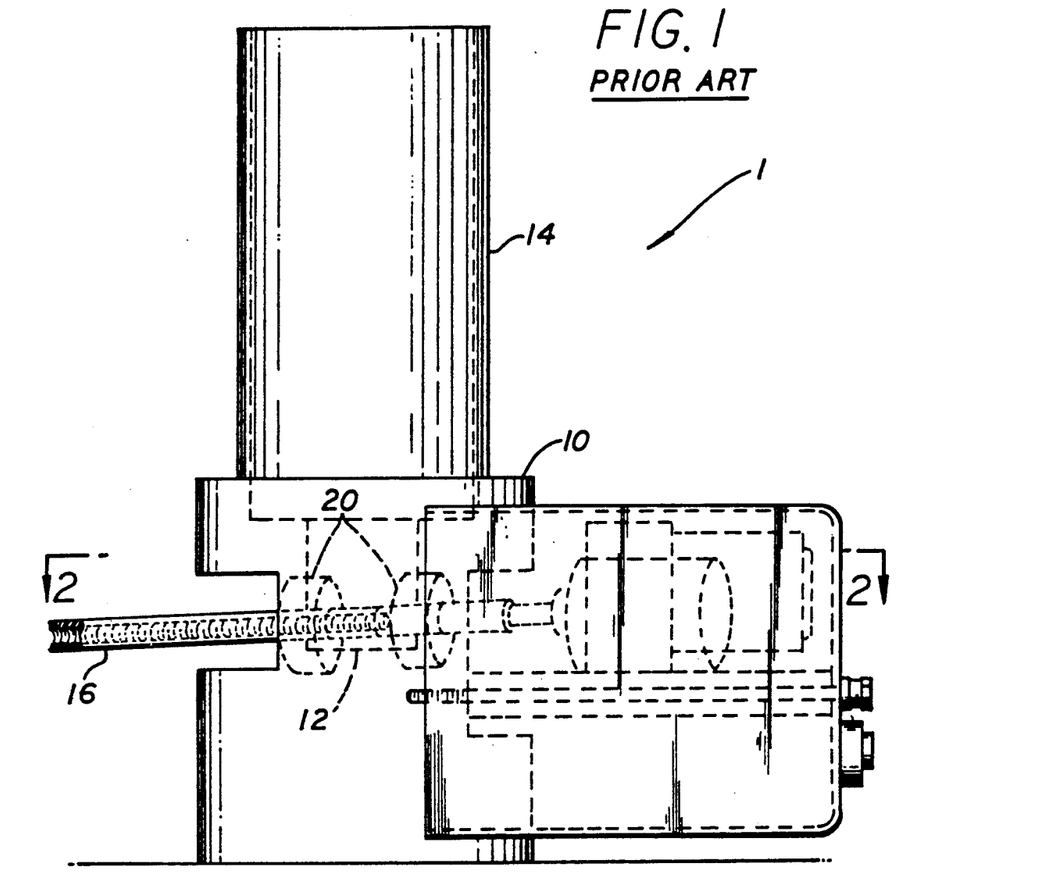
FIG. 1 shows a side elevational view of a powder dispensing apparatus constructed in accordance with the above-referenced Ellion patent.
Figure 2:
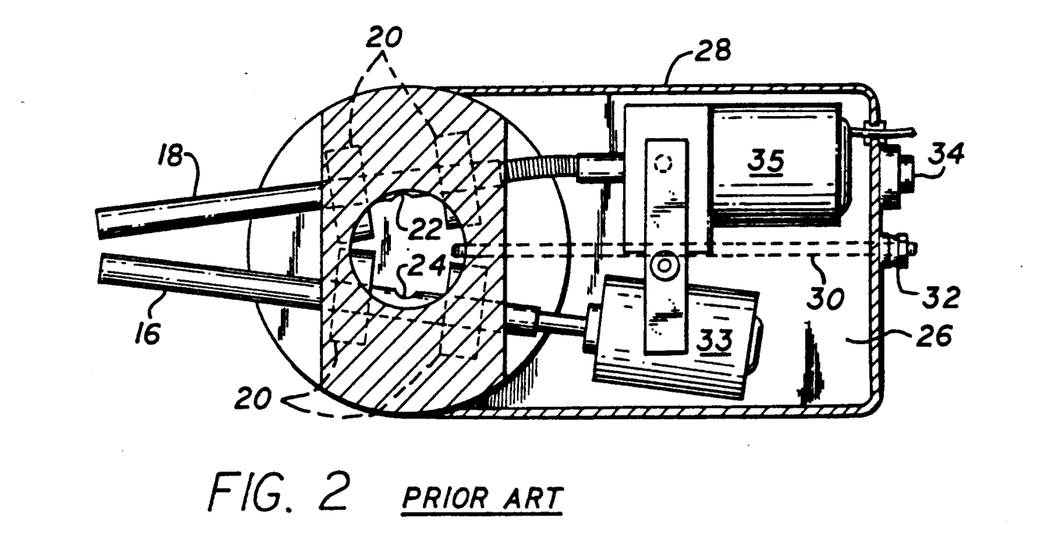
FIG. 2 shows a cross-sectional view of the base and powder chamber of the apparatus of FIG. 1 taken along the line 2—2 thereof.

FIG. 1 shows a side elevational view of a powder dispensing apparatus 1 constructed in accordance with the teachings of the referenced Ellion patent, which are hereby incorporated herein by reference. FIG. 2 shows a cross-sectional view of the base and powder chamber of the apparatus of FIG. 1 taken along the line 2—2 thereof. As shown in FIG. 1, the apparatus 1 includes a base 10 which provides a chamber or bowl 12 (shown in phantom). The chamber 12 acts as a hopper for powder (e.g. gunpowder) poured into a funnel 14. A pair of barrels 16 and 18 extend into the bowl 12. Each barrel 16 or 18 has a respective entry port 24 and 22, respectively, as shown in the cross-sectional view of FIG. 2. The entry ports continuously receive powder from the chamber 12 and admit it into the bore of the barrel. The barrels 16 and 18 are rotatably mounted in bushings or bearing 20 (shown in phantom) and are driven by motors 33 and 35, respectively. The motors 33 and 35 drive the barrels 16 and 18 at different rates of speed to achieve coarse and fine powder dispensation rates respectively. As the barrels 16 and 18 rotate, powder drops from the chamber 12 into the barrels 16 and 18 via the entry ports 24 and 22 respectively. The continued rotation of the barrels is effective to cause the powder to flow along the length thereof and ultimately to be dispensed onto a pan 50 of a conventional balance scale 40. See FIG. 3. The pan 50 hangs from one end 52 of an arm 48 which is balanced on a pivot 46. A weight 54 provides for the precise selection of the amount of powder to be delivered. A sensor system 56 is mounted adjacent to the balance arm 48. The sensor system 56 includes a pair of optical electronic combinations. A lower combination is a first light source 60 and a first light receptor 64. An upper combination is a second light source 58 and a second light receptor 62. The sensor system 56 is electrically connected to a control circuit (not shown) which controls the activation of the motors 33 and 35.

Figure 3:
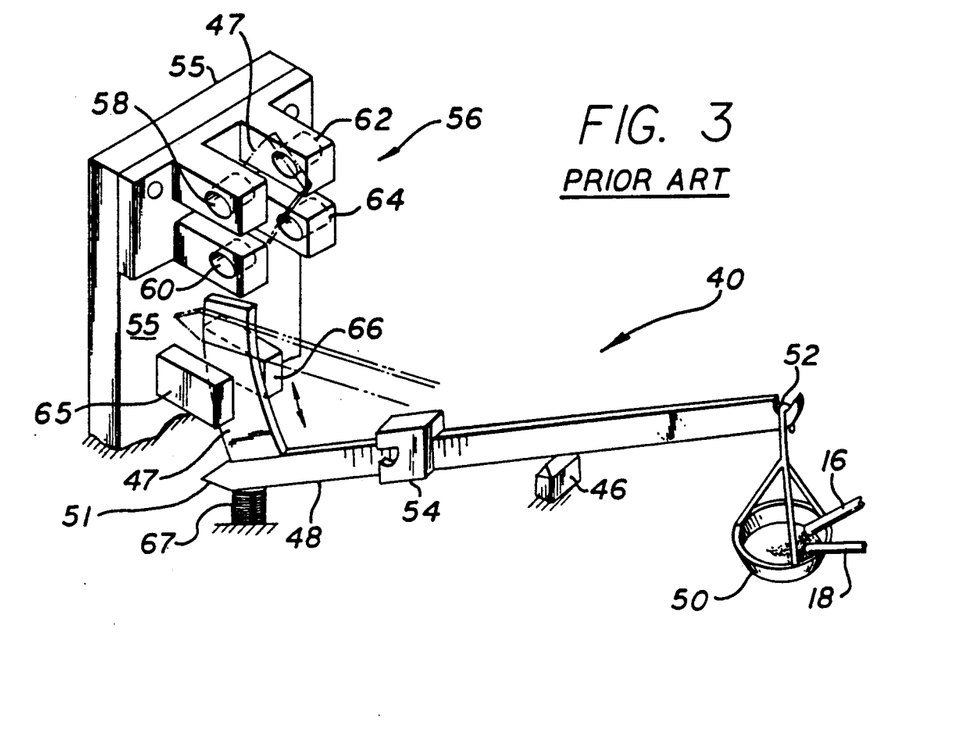
FIG. 3 shows a conventional scale used in connection with the powder dispensing apparatus constructed in accordance with the above-referenced Ellion patent.

As the amount of powder on the pan 50 increases, the end 51 of the arm 48, opposite the pan 50, begins to rise. Eventually, an interrupter blade 47 passes between the first light source 60 and first optical receptor 64. This stops the first motor 33 and the flow of powder from the first (coarse) barrel 16. This, in turn, reduces the flow rate of powder to a slower rate determined by the rotation rate of the second motor 35. The slower rate continues until the interrupter blade 47 passes between the second light source 58 and the second light receptor 62. This stops the second motor 35 and the flow of powder from the second (fine) barrel 18. Magnets 65 and 66 provide for magnetic damping of the arm 48. A spring 67 provides for some inertial assistance of the arm 48 but only during the initial movement thereof.

As mentioned above, although this design provides a substantial improvement in the powder dispensing and measurement art, there are several areas in which it may be further improved. For example, the Ellion apparatus uses electric motors 33 and 35 with reduction gears (not shown) to supply power. This is due to the fact that the control of the amount of powder dispensed with a reasonable degree of precision requires the coarse feed barrel 16 to be limited to approximately 120 revolutions per minute (RPM) and the fine feed barrel 18 to be limited to roughly 30 revolutions per minute. Electric motors rated in this range operate at dangerously high voltage and current levels for the gunpowder loading application. On the other hand, small electric motors that operate with reasonable voltage and current ratings run in the 3000 to 6000 RPM range. As a result, small motors must be used with gears or other speed reduction components. The prior preferred approach, therefore, involved the use of a high speed motor, having a high angular momentum, with a set of expensive reduction gears.

In addition to being costly, the speed reduction components add to the system momentum. The high angular momentum of such systems poses problems in that the barrels 16 and 18 continue to rotate after power to the motors 33 and 35 is cut off. Even with a bypass diode across the motor to dissipate the momentum energy, a considerable amount of powder is dispensed after power is shut off. The solution offered in the referenced patent is to provide a vertical adjustment for the fast feed barrel control sensor 60 and 64. Unfortunately, that solution merely provides a better anticipation of the amount of the overflow, but does not limit the momentum of the gear motor-barrel assembly. The amount of powder dispensed after the power is shut off is controlled more precisely but there is still a variation in the amount of overflow between each loading which is difficult to anticipate or control.

Other problems associated with the apparatus of the referenced patent include scale inertia and jamming. The scale inertia problem arises when powder is loaded on the scale 40 at a high speed. Whenever, this occurs, the inertia of the scale arm 48 is such that the scale 40 does not respond fast enough to provide a sufficiently accurate reading throughout the loading process. Thus, the desired preselected weight is reached before the scale arm 48 is in a position to activate the cutoff sensor 58, 62. The result is an undesirable overflow and/or an overshoot of the cutoff point with some vacillation thereabout.

The jamming problem may arise when cylindrically shaped powder is caught partially into the entry port 22 or 24 of a barrel 16 or 18 or when very fine powder enters the bushings 20.

Figure 4:
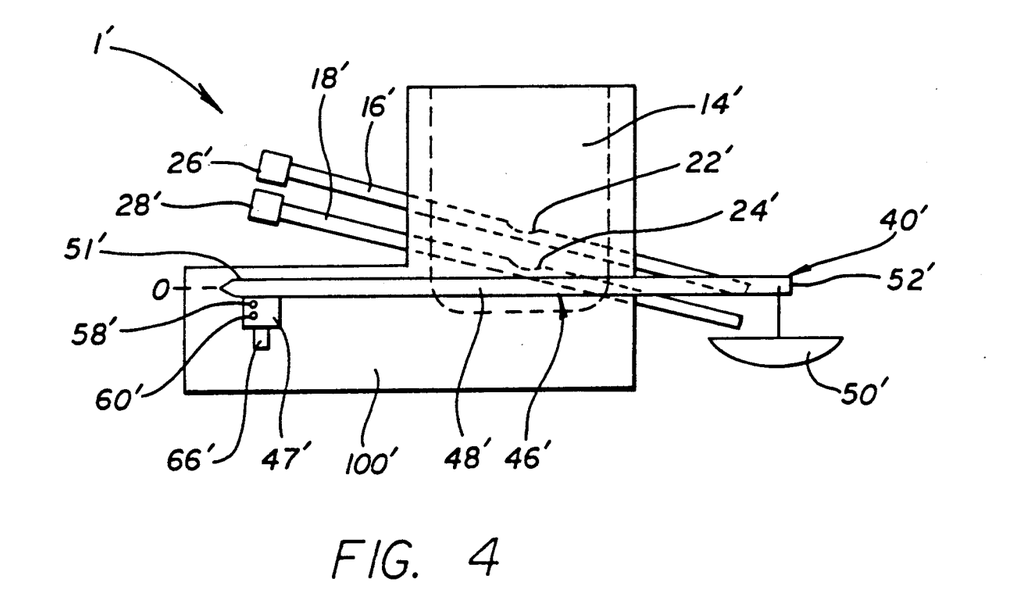
FIG. 4 shows a simplified elevational side view of the improved powder dispensing and measurement apparatus of the present invention.

The present invention addresses the need in the art for an inexpensive, reliable, accurate, high speed powder dispensing apparatus. In the improved powder dispensing apparatus of the present invention the barrels are vibrated to cause powder to translate on a surface thereof. The vibration is controlled to cause a measured amount of powder to be dispensed. A simplified elevational side view of the improved powder dispensing and measurement apparatus of the present invention is shown in FIG. 4. The apparatus 1' includes a chamber 14' (shown in phantom) which holds a supply of the powder to be dispensed. A fast feed barrel 16' and a slow feed barrel 18' extend through the chamber 14' and receive powder through entry ports or inlets 22' and 24' respectively. The barrels 16' and 18' are slanted to deposit powder in a pan 50' suspended from one end 52' of a balance arm 48' of a conventional mechanical scale 40'. The balance arm 48' pivots about pivot point 46' such that the second end 51' of the arm 48' moves about a zero point 0. As discussed above with respect to the prior Ellion apparatus, the arm 48' of the scale 40' of the apparatus 1' of the present invention includes an optical interrupter and magnetic damper 47', a fast barrel optical sensor 60' and a slow barrel optical sensor 58'. The sensors 58' and 60' include a light emitting element and a light receiving element separated by a gap through which the interrupter 47' passes. The sensors 58' and 60' are connected to the vibrators 26' and 28' via a control circuit (not shown) such as that utilized in the above-referenced patent to Ellion et al incorporated herein by reference. The control circuit performs the function of activating and deactivating the vibrators 26' and 28' in response to the output of the sensors 58' and 60'. The chamber 14', barrels 16' and 18', vibrators 26' and 28' and scale 40' are disposed on or in a base 100'. A magnet 66' is secured to the base 100' to facilitate the magnetic damping of the arm 48' of the scale 40'.

In the preferred embodiment, the barrels 16' and 18' are smooth. Electrically activated vibrators 26' and 28' are attached to the upper end of the first and second barrels 16' and 18' respectively. The vibrators 26' and 28' may be electrical vibrators or piezo-electric transducers of conventional construction. The angle and dimensions of each of the barrels and the amplitude and frequency of the vibration of each of the vibrator may be chosen by one skilled in the art to achieve the desired powder flow rate.

Figure 5:
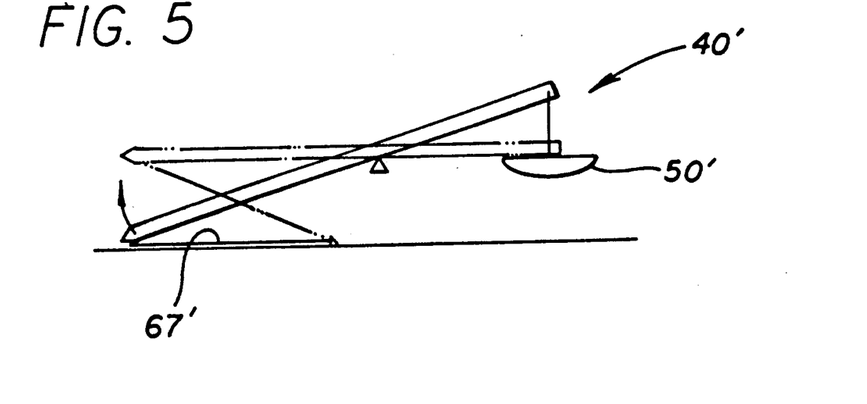
FIG. 5 shows a simplified view of the scale of the preferred embodiment of the improved powder dispensing apparatus of the present invention.

In operation, the vibrators 26' and 28' are activated causing powder to be dispensed very rapidly. After an amount is dispensed which is close to the desired weight, the vibration of the fast feed barrel 16' by the first vibrator 26' is caused to stop by the fast barrel sensor 60' which senses the position of the second end 51' balance arm 48'. The slower feed barrel 18' continues to supply the desired small final amount of powder until the slow barrel sensor 58' terminates the vibration of the slow barrel 18' by the second vibrator 28'. As illustrated in the simplified view of the scale 40' of the apparatus of the present invention as provided by FIG. 5, a specially designed control spring 67' provides the slow smooth movement of the balance arm 48' from the initial position to the zero position shown in phantom while powder is dispensed into the pan 50' at a very high rate. The advantageous design of the control spring 67' of the present invention is best illustrated with a preliminary review of the basic operation of a conventional balance scale.

Figure 6:
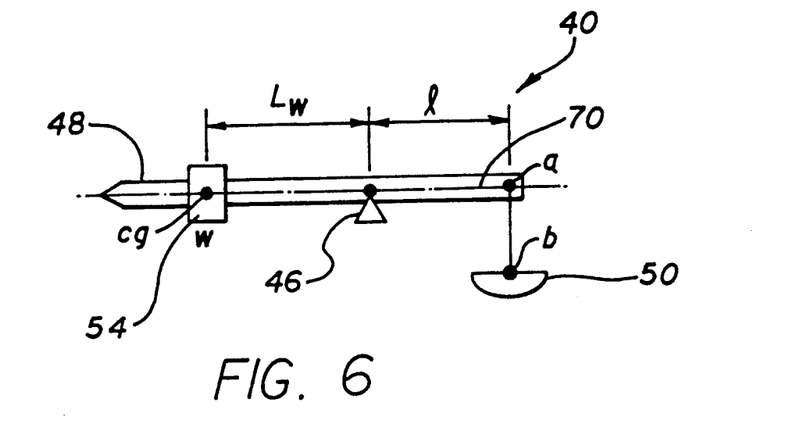
FIGS. 6-9 are simplified diagrams provided to illustrate the operation of a conventional balance scale.

As illustrated in the simplified diagram of FIG. 6, the conventional balance scale 40 is merely a balance arm 48 resting on a pivot 46 with a tray or pan 50, to hold the object to be weighed, suspended on one end and a movable calibrated weight 54 that can be positioned along the arm 48 on the other side of the pivot 46. The location of this calibrated weight 54 when the arm 48 is horizontal is a measure of the weight of the object in the pan 50.

For proper operation, the center of mass (center of gravity) of the powder to be weighed must act at a fixed distance from the pivot 46 regardless of the position of the powder in the pan 50. This requirement is met in the conventional balance scale 40 by suspending the pan 50 from the balance arm 48 with a connector that has attachments at the arm 48 and at the pan 50 which allow free rotation. Since these attachments can not transfer any torque to the arm 48, the weight of the pan 50 and the powder is transferred vertically at the suspension point of the arm 48 regardless of the position of the powder in the pan 50. If the connector of the pan 50 to the arm 48 were rigid and not free to rotate, the torque on the arm 48 about the pivot 46 would depend on the specific location of the powder in the pan 50. In this case, if the center of gravity of the powder is displaced from the vertical line to the point where the connector attaches to the arm 48, it will produce a moment that will be transferred to the arm 48 and result in an additional torque to the arm 48. Thus, it is necessary to suspend the pan 50 with attachments that will allow free rotation.

A second requirement for proper operation of this simplified conventional balance scale 40 is that the center of gravity of the movable weight 54 not lie on an extension of an imaginary line 70 connecting the pivot 46 to the point where the pan 50 suspension attaches to the balance arm 48.

Consider the balance scale 40 illustrated in FIG. 6 where the powder to be weighed is placed in the pan 50 on the right side of the balance arm 48. The pan 50 is suspended from and is free to rotate about points (a) and (b). When the movable calibrated weight 54, W, is placed at a position $L_W$ from the pivot 46, let the balance arm 48 be in equilibrium in the horizontal position. Note that the scale 40 in this illustration has the center of gravity (cg) of the movable weight 54, the pivot point 46 and the swivel point (a) of the pan 50 all in a straight line.

The balance relation becomes:

$$WL_W = (w_{pan} + w)l \quad [1]$$

where

W is the calibrated weight 54;

$L_W$ is the distance from the center of gravity of the weight 54 to the pivot 46 point;

$w_{pan}$ is the weight of the pan 50 and support wire;

w is the weight of the powder; and l is the distance from the suspension point a of the pan 50 to the pivot 46.

Figure 7:
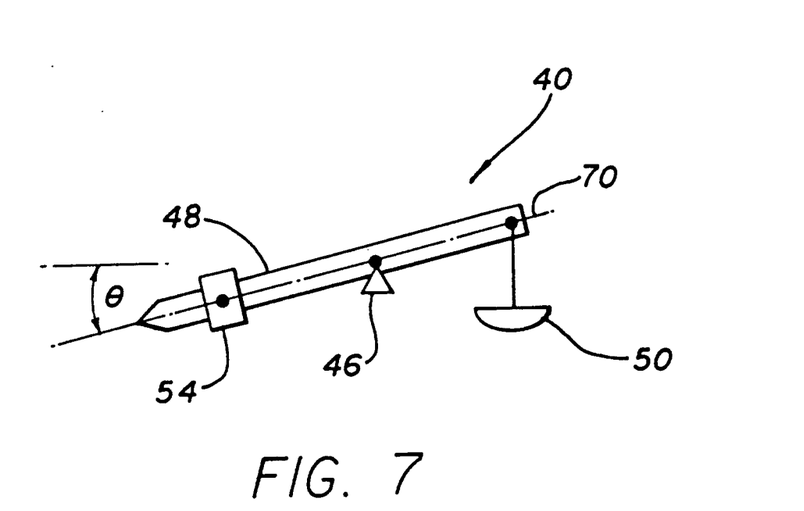

It can be seen, however, that this type of apparatus is stable at any balance arm 48 orientation and therefor is not suitable as a balance scale 40. This can be seen from FIG. 7 for the illustration where the arm 48 is at an angle Θ from the horizontal. The balance relation becomes:

$$WL_W \cos \Theta = (w_{pan} + w)l \cos \Theta \qquad [2]$$

Since the common term, cos Θ, appears on both sides of the equation, for the same value of powder weight and location of the calibrated weight 54 as for equation [1] where the arm 48 was horizontal, the arm 48 will be stable at any value of Θ. As a result, it is necessary to have the line 70 that connects the center of gravity of the movable weight 54 (cg) to the pan 50 suspension point not pass through the pivot 46 point. In addition, for stable equilibrium it is necessary for the imaginary line 70 to pass below the pivot 46. Two possible methods of many for accomplishing this requirement are illustrated in FIGS. 8 and 9.

Figure 8A:
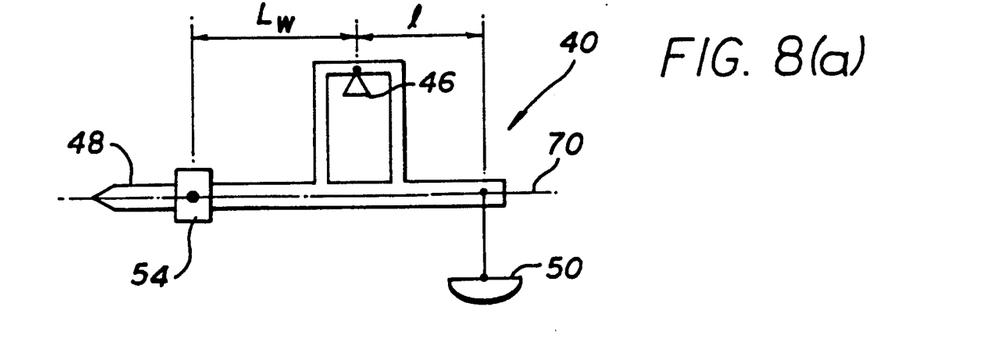

In FIG. 8, the movable weight 54 and pan 50 are attached to the balance arm 48 as in the previous illustration. However, the arm 48 in this case is suspended from the pivot 46 by a rigid connector that can not move relative to the arm 48 but which is free to rotate about the pivot 46. In this case, it is clear that the balance relation for a horizontal arm 48 (FIG. 8a) is:

$$WL_W = (w_{pan} + w)l \qquad [3]$$

Figure 8B:
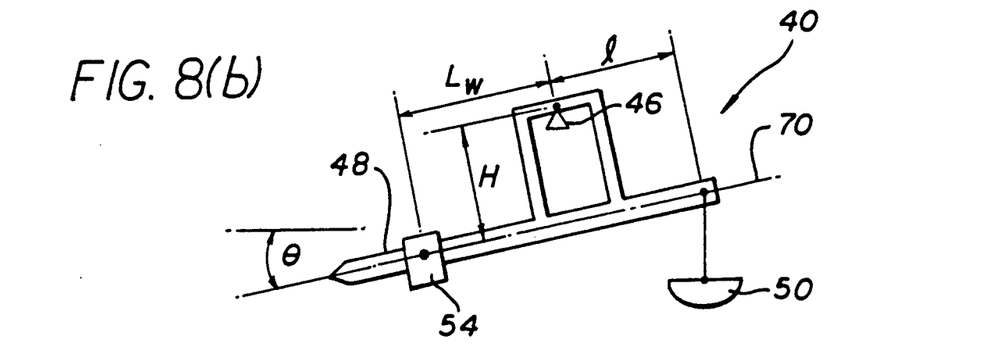
Figure 9:
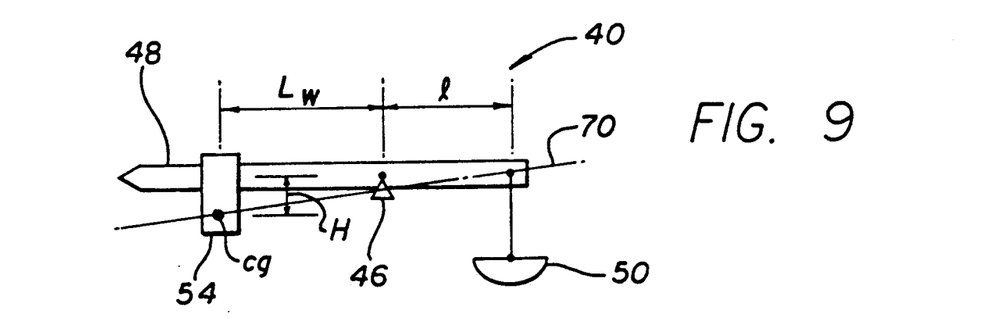

Now it can be illustrated that this balance arm 48 is not stable at any orientation other than the horizontal. Assume that the arm 48 is rotated to an orientation angle of Θ from the horizontal, as shown in FIG. 8(b) while keeping the same amount of powder in the pan 50 and the same location of the calibrated weight 54. The balance relation is:

$$W(L_W \cos \Theta - H \sin \Theta) = (w_{pan} + w)(l \cos \Theta + H \sin \Theta)$$

or  [4]

$$WL_W \cos \Theta = (w_{pan} + w)l \cos \Theta + [WH + (w_{pan} + w)H] \sin \Theta$$

Dividing the equation by cos Θ, gives:

$$WL_W = (w_{pan} + w)l + [WH + (w_{pan} + w)H] \tan \Theta \qquad [5]$$

By comparing equations [5] and [3], it is seen that the right side of equation [5] is greater than the left side by the quantity $[WH + (w_{pan} + w)H] \tan \Theta$. Consequently, the arm 48 will move in a clockwise direction until the value of tan Θ becomes equal to zero and the arm 48 is in the horizontal position. Similarly, if the weight of the powder w is low, the arm 48 will remain in a position counter clockwise from horizontal. Thus, it is seen that the arm 48 is stable only at one orientation for any given weight of powder.

FIG. 9 illustrates another more convenient configuration where the imaginary straight line 70 connecting the center of gravity of the movable weight 54 to the swivel point of the pan 50 is below the pivot 46. This arrangement acts in a similar manner as the FIG. 8 illustration with the balance equation being:

$$WL_W = (w_{pan} + w)l + WH \tan \Theta \qquad [6]$$

The conventional balance scale 40 has been described, it is now possible to understand its limitations.

It has been shown that the conventional balance scale 40 is stable and indicates true weights. However, if powder is dispensed very rapidly into the pan 50, the arm 48 will move in an uncontrolled fashion and will not be suitable for providing the high degree of accuracy required for optimum performance in a high speed powder dispensing and measuring application. The following discussion of the operation of the arm 48 as powder is fed very rapidly into the pan 50 will make the problem clear and the solution afforded by the controlled spring 67′ of the present invention will be understood.

With no powder in the pan 50, let the balance arm 48 be oriented at an angle $\Theta_o$ from the horizontal and resting on a mechanical stop. As powder is dispensed into the pan 50, the arm 48 will rotate in a clockwise fashion about the pivot 46. Because of the inertia of the arm 48 assembly, the angle of the arm 48 is greater than it would be at equilibrium. Consequently, any sensor to turn off the flow of powder would have to anticipate the equilibrium position of the arm or it would not be activated when required and the quantity of powder that is dispensed would exceed the desired amount. There is, however, a self compensating feature that results from the center of gravity of the calibrated weight 54 being below the imaginary line 70 between the pivot 46 and the suspension point of the pan 50. The compensating factor is the term, WHtan Θ, which is greater at the larger angle and thus produces a counteracting moment which is less than it would be at the equilibrium orientation for the existing amount of powder. This effect tends to compensate for the lag in the motion of the arm 48 due to inertia.

It is seen that as the arm 48 approaches the horizontal position (Θ=0), the increase in the counter clockwise moment due to the compensating factor requires that more powder be dispensed to the pan 50. The result is that even though the inertia of the arm 48 has allowed more powder to be dispensed into the pan 50 at any given orientation of the arm 48, the amount of powder needed at the horizontal equilibrium position is also greater. The result is the inertia forces tend to be compensated by the compensating factor, WHtan Θ. Unfortunately, a practical size of scale 40 limits the value of H and the compensating effect is minimal.

Now the design and operation of the advantageous control spring 67′ of the present invention can be fully appreciated.

Figure 10:
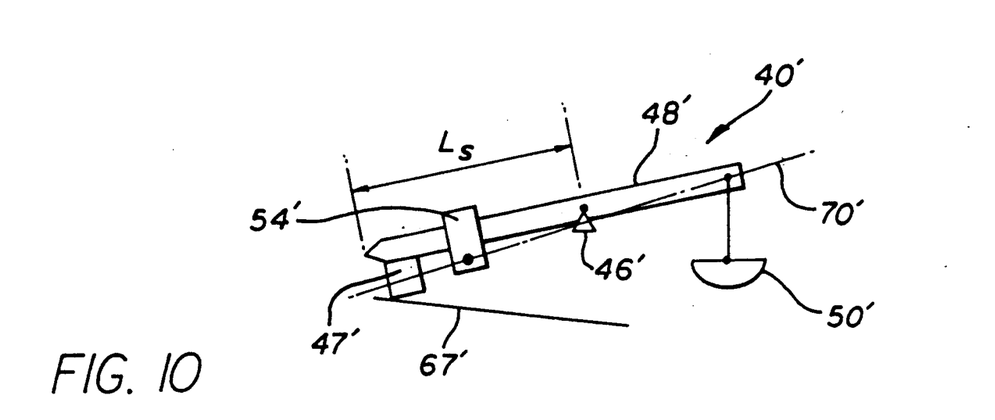
FIG. 10 is a simplified diagram illustrative of the operation of the improved control spring of the present invention.

The control spring 67′ can be any conventional spring, i.e., coil, leaf, etc. A leaf spring is chosen for illustration as shown in the preferred embodiment of the scale 40′ of the present invention as illustrated in FIG. 10. Taking moments about the pivot 46′ and for simplicity of explanation eliminating the mass of the interrupter blade, gives the balance equation as:

$$W(L_W \cos \Theta - H \sin \Theta) - FL_s \cos \Theta = (w_{pan} + w)l \cos \Theta$$

or $$W(L_W - H \tan \Theta) - FL_s = (w_{pan} + w)l \qquad [7]$$

where:

F is the spring force and $L_s$ is the location on the arm 48′ where the spring acts. For a linear spring, the force can be written as:

$$F = kL_s \tan \Theta \qquad [8]$$

where k is the spring constant.

Equation [7] can be rewritten using equation [8] approximately as:

$$W(L_W - H\tan\Theta) - kL_s^2\tan\Theta = (w_{pan}+w)l \quad [9]$$

With this arrangement of the spring 67', it can be seen that the counteracting force of the spring 67' decreases as the arm 48' rotates in a clockwise direction. The effect is similar to the compensating factor, $WH\tan\Theta$, and thus also tends to overcome the effect of inertia. Although the control spring 67' acts in a similar manner, it has the great advantage that almost any desired value of force can be obtained in a practical scale 40' by the proper choice of the spring constant k.

It will now be shown how to obtained the detailed design for the controlled spring 67'.

In order to have a precise measure of the powder in the pan 50', it is desired to have a zero spring force acting on the arm 48' when it is in the horizontal position. This requirement determines the unstressed position of the spring 67' as being very slightly below the arm 48' when the arm 48' is horizontal.

Secondly, it is further desired that the spring 67' operate as soon as any powder is dispensed into the pan 50' in order to overcome the initial inertia of the balance arm 48' assembly. This requirement determines that the spring 67' must exert a force on the arm 48' that is just equal to the force of the arm on the spring so that the arm does not rest on a mechanical stop when there is no powder in the pan 50'.

Thirdly, it is desired to have the balance arm 48' move as slowly as practical to minimize both the starting inertia and the final momentum.

These three requirements can be accomplished with a properly designed control spring 67'.

Equation 9 can be written by approximating $\tan\Theta$ with $\Theta$ for the angle of interest in a practical scale 40':

$$W(L_W - H\Theta) - kL_s^2\Theta = (w_{pan}+w)l \quad [10]$$

Differentiating this equation with respect to time gives:

$$(WH + kL_s^2)d\Theta/dt = l\,dw/dt \quad [11]$$

Since it is desired to have a very high dispensing rate, $dw/dt$, and a very slow motion of the arm 48', $d\Theta/dt$, it is seen from this equation that the spring constant, k, should be as high as possible. This is because all of the parameters in equation [11] except the spring constant are determined by the practical size of the scale 40'. The requirements for a large spring constant and that the spring force go to zero when the arm 48' is horizontal are still not sufficient to define completely the design of the control spring 67' since the force of the spring 67' with no powder in the pan 50' is unknown at this time. To determine this force, it is necessary to specify the desired initial orientation of the arm 48' with no powder in the pan 50'.

A high spring constant k means that a small deflection of the control spring 67' causes a large change in the spring force. Equation [7] shows that the spring force with no powder in the pan 50' $F_o$ is:

$$F_o = kL_s\Theta_o = [W(L_w - H\tan\Theta_o) - w_{pan}l]/L_s \quad [12]$$

where $\Theta_o$ is the orientation of the arm 48' with no powder in the pan 50'.

In the extreme case, the orientation of the arm 48' with no powder in the pan 50' would be only slightly below the horizontal since this results in the greatest spring force.

Another approach to reaching this conclusion that the orientation of the arm 48' with no powder in the pan 50 should be close to the horizontal can be to consider the requirement that the arm 48' move slowly. To dispense a given amount of powder in the shortest period of time and to have the arm 48' move slowly requires that the arm 48' not have to move very far. Thus, the initial orientation angle of the arm 48' should be as small as practical.

Practical considerations finally determine the desired spring constant and consequently the orientation of the arm 48' with no powder in the pan 50'. One of these considerations is that it is desirable to have a reasonable arm 48' movement between the empty pan 50' position and the horizontal position so that the operator can verify visually that the scale 40' is functioning properly. Additionally, if a very small change in the position of the arm 48' accounts for a very large change in the amount of powder in the pan 50', the inexpensive sensors may have too large an optical beam to locate precisely the position of the arm 48' and will be unable to shut off the dispensing motor in an accurate manner. It has been determined by experiment with a variety of powder sizes and with inexpensive optical sensors, that the initial orientation of the arm 48' should be between 5 degrees and 10 degrees from the horizontal for a scale 40' of practical size. This is the final piece of data needed to define the control spring 67 in detail using equation [12] to calculate the spring constant.

One further consideration is that the spring 67' be fabricated from non-magnetic material so that the damping magnets will not attract the spring 67' and change the effective spring constant.

It should also be noted that the distance between the barrel exits and the pan 50' should be minimized as the weight of the powder that has left the barrel but not yet reached the pan 50' is not sensed by the balance arm 48'.

Thus, an inexpensive, reliable, accurate, high speed powder dispensing apparatus has been described herein with reference to a particular embodiment for a particular application. As the need to rotate barrels is eliminated, the likelihood of occasional jamming is eliminated. The momentum of the feed devices of the present invention is orders of magnitude lower than the loader of the referenced patent. As a result, the apparatus of the present invention ceases to dispense powder as soon as the power is shut off. The extremely low inertia of the vibrating barrels and the unique spring allow all types of powder to be dispensed rapidly and reliably without the requirement to adjust the relative positions of the fast and slow barrel sensors thereby decreasing complexity and costs.

Those having ordinary skill in the art and access to the present teachings will recognize additional modifications applications and embodiments within the scope thereof. For example, the invention is not limited to the shape of the powder dispensed. Nor is the invention limited to the shape of the barrels provided in the illustrative embodiments. The invention is not limited to the means shown for vibrating the barrels. Further, the invention is not limited to use with a mechanical scale. And where a mechanical scale of the advantageous design of the present disclosure is used, the invention is not limited to the type of spring used or other means of providing the required control force, nor to the type of mechanism for sensing the position of the arm thereof. The dispensing rate can be adjusted in several ways, e.g., by changing the angle of the barrels, the vibration rate, the vibration characteristics (including such factors as the force of the vibration, the thickness or length of the barrel, and the material of the barrel) and etc.

It is therefore intended by the appended claims to cover any and all such applications, modifications and embodiments within the scope of the present invention. Accordingly,

What is claimed is:

1. An improved powder dispensing apparatus comprising:
    barrel means for transferring powder from a first retainer to a second retainer;
    vibrating means for inducing vibration in said barrel effective to cause said powder to translate on a surface thereof;
    scale means for measuring the amount of powder transferred to a second retainer, wherein said scale means is a mechanical scale having a balance arm and spring means in contact with a first end thereof for assisting the movement of said balance arm from an initial position to a point just below a second position at which it is in equilibrium with said second powder retainer suspended at an opposite end thereof; and
    control means for controlling the activation of said vibrating means.

2. The invention of claim 1 including sensor means for detecting the position of said balance arm and providing an electrical signal to said control means in response thereto.

3. The invention of claim 2 wherein said barrel means includes first and second barrels mounted at first and second angles for fast and slow transfer of powder from said first retainer to said second retainer.

4. The invention of claim 2 wherein said barrel means includes first and second barrels mounted with first and second vibration levels, respectively, for fast and slow transfer of powder from said first retainer to said second retainer.

5. A method for dispensing powder including the steps of:
    transferring powder from a first retainer to a mechanical balance scale having a balance arm via a barrel;
    inducing vibration in said barrel effective to cause said powder to translate on a surface thereof;
    selectively controlling the activation of said vibrating means; and
    assisting the movement of said balance arm from an initial position to a point just below a second position at which it is in equilibrium with the weight of the powder transferred thereto.

6. An improved powder dispensing apparatus comprising:
    barrel means for transferring powder from a first retainer to a second retainer, said barrel means including first and second barrels mounted at first and second angles for fast and slow transfer of powder from said first retainer to said second retainer;
    vibrating means for inducting vibration in said barrel means effective to cause said powder to translate on a surface thereof;
    scale means for measuring the amount of powder transferred to a second retainer, wherein said scale means is a mechanical scale having a balance arm and spring means in contact with a first end thereof for assisting the movement of said balance arm from an initial position to a point just below a second position at which it is in equilibrium with said second powder retainer suspended at an opposite end thereof;
    control means for controlling the activation of said vibrating means; and
    sensor means for detecting the position of said balance arm and providing an electrical signal to said control means in response thereto.

* * * * *